(12) United States Patent
Da Silva Quelhas et al.

(10) Patent No.: US 11,373,273 B2
(45) Date of Patent: Jun. 28, 2022

(54) METHOD AND DEVICE FOR COMBINING REAL AND VIRTUAL IMAGES

(71) Applicant: Apple Inc., Cupertino, CA (US)

(72) Inventors: Pedro Manuel Da Silva Quelhas, Sunnyvale, CA (US); Stefan Auer, Munich (DE)

(73) Assignee: APPLE INC., Cupertino, CA (US)

( * ) Notice: Subject to any disclaimer, the term of this patent is extended or adjusted under 35 U.S.C. 154(b) by 34 days.

(21) Appl. No.: 17/022,433

(22) Filed: Sep. 16, 2020

(65) Prior Publication Data

US 2020/0410642 A1    Dec. 31, 2020

Related U.S. Application Data

(63) Continuation of application No. 16/103,920, filed on Aug. 14, 2018, now Pat. No. 10,817,983.

(60) Provisional application No. 62/564,902, filed on Sep. 28, 2017.

(51) Int. Cl.
*G06T 3/40*      (2006.01)
*G06T 19/00*     (2011.01)

(52) U.S. Cl.
CPC .......... *G06T 3/4038* (2013.01); *G06T 3/4053* (2013.01); *G06T 19/006* (2013.01)

(58) Field of Classification Search
CPC .... G06T 3/4038; G06T 3/4053; G06T 19/006
See application file for complete search history.

(56) References Cited

U.S. PATENT DOCUMENTS

| | | | |
|---|---|---|---|
| 10,152,775 B1* | 12/2018 | Bellows | G06T 1/20 |
| 2006/0115184 A1* | 6/2006 | Michel | H04N 1/3935 |
| | | | 382/299 |
| 2009/0109219 A1* | 4/2009 | DeCoro | G06T 17/20 |
| | | | 345/423 |
| 2014/0321702 A1* | 10/2014 | Schmalstieg | G06K 9/00624 |
| | | | 382/103 |
| 2015/0086134 A1* | 3/2015 | Hameed | G06T 1/20 |
| | | | 382/279 |
| 2016/0189429 A1* | 6/2016 | Mallinson | G02B 27/017 |
| | | | 345/633 |
| 2017/0249771 A1* | 8/2017 | Obert | G06T 15/06 |
| 2018/0005075 A1* | 1/2018 | Shacham | G06T 1/60 |
| 2018/0089890 A1* | 3/2018 | Shreiner | G06T 17/20 |
| 2018/0095463 A1* | 4/2018 | Castleman | G05D 1/0022 |
| 2018/0278985 A1* | 9/2018 | De Haan | H04N 21/42653 |

* cited by examiner

*Primary Examiner* — Christopher M Brandt
(74) *Attorney, Agent, or Firm* — Fernando & Partners, LLP

(57) ABSTRACT

In one implementation, a method includes obtaining, for a particular pixel of an image, a real pixel value and a virtual pixel value. The method includes obtaining, for the particular pixel of the image, a first alpha and a second alpha. The method includes generating, for the particular pixel of the image, a combined pixel value as a weighted average of the real pixel value and the virtual pixel value, the weighting being based on at least one of the first alpha and the second alpha.

20 Claims, 10 Drawing Sheets

METHOD AND DEVICE FOR COMBINING REAL AND VIRTUAL IMAGES

CROSS-REFERENCE TO RELATED APPLICATIONS

This application is a continuation application of U.S. patent application Ser. No. 16/103,920, filed on Aug. 14, 2018, which claims priority to U.S. Provisional Patent App. No. 62/564,902, filed on Sep. 28, 2017, both of which are hereby incorporated by reference in their entirety.

TECHNICAL FIELD

The present disclosure generally relates to augmented reality or mixed reality, and in particular, to systems, methods, and devices for combining images for augmented reality or mixed reality providing video see-through.

BACKGROUND

In an augmented reality experience, virtual objects are presented in a representation of a scene in which the user is present. In a mixed reality experience, a virtual scene is presented including images of real objects in the scene in which the user is present. Accordingly, real image data and virtual image data are combined upon a display. Combining the real image data and the virtual image data, particularly at high frame rates, presents computational and other challenges.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
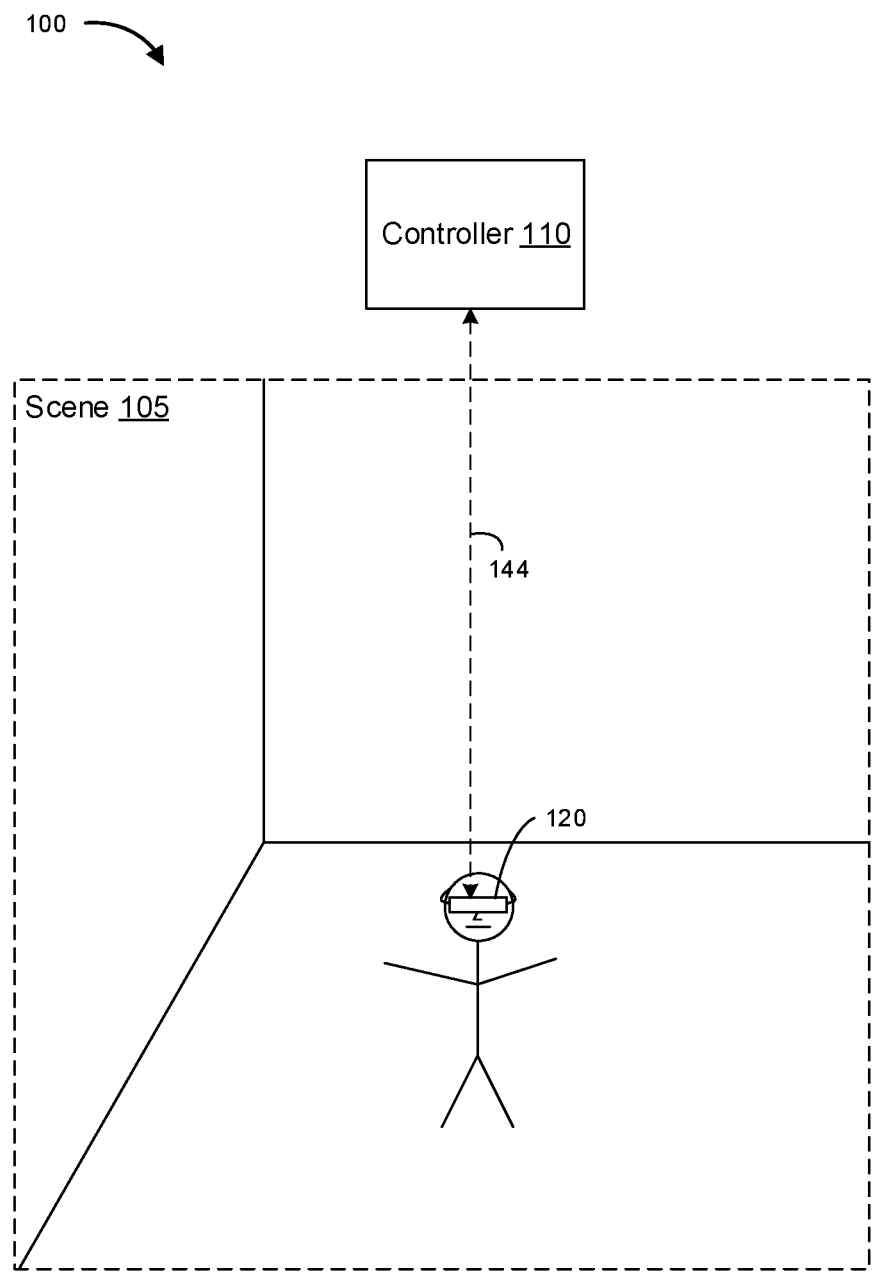
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for combining images for augmented reality with video see-through. The method includes obtaining, for a particular pixel of an image, a first alpha and obtaining, for the particular pixel of the image, a second alpha. The method includes obtaining, for the particular pixel of the image, a real pixel value and obtaining, for the particular pixel of the image, a virtual pixel value. The method includes generating, for the particular pixel of the image, a combined pixel value as a weighted average of the real pixel value and the virtual pixel value, the weighting being based on at least one of the first alpha and the second alpha.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

In various implementations, an HMD providing an augmented reality experience includes a camera to image a scene and a display to present a representation of the scene with virtual objects. In order to present the virtual objects in the foreground or background of the scene, blending of real image data and virtual image data is performed based on an alpha matting.

In various implementations, the matting is performed on streaming data such that the representation of the scene is presented in near real-time. In various implementations, the HMD performs matting on streaming data without buffering. To complicate the problem, power consumption due to computation at the HMD is to be kept small, but minimal amounts of data can be transmitted to and from a controller for additional computation.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120.

In some embodiments, the controller 110 is configured to manage and coordinate an augmented reality/virtual reality (AR/VR) experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some embodiments, the controller 110 is communicatively coupled with the HMD 120 via one or more wired or wireless communication channels 144 (e.g., BLUETOOTH, IEEE 802.11x, IEEE 802.16x, IEEE 802.3x, etc.).

In some embodiments, the HMD 120 is configured to present the AR/VR experience to the user. In some embodiments, the HMD 120 includes a suitable combination of software, firmware, and/or hardware. The HMD 120 is described in greater detail below with respect to FIG. 3. In some embodiments, the functionalities of the controller 110 are provided by and/or combined with the HMD 120.

According to some embodiments, the HMD 120 presents an augmented reality/virtual reality (AR/VR) experience to the user while the user is virtually and/or physically present within the scene 105. In some embodiments, the HMD 120 is configured to present content and to enable video see-through of the scene 105 with total or spatially selective video pass-through, with or without blending of virtual content.

In some embodiments, the user wears the HMD 120 on his/her head. As such, the HMD 120 includes one or more AR/VR displays provided to display the AR/VR content, optionally through an eyepiece or other optical lens system. For example, in various implementations, the HMD 120 encloses the field-of-view of the user. In some embodiments, the HMD 120 is replaced with a handheld device (such as a smartphone or tablet) configured to present AR/VR content in which the user does not wear the HMD 120, but holds the device with a display directed towards the field-of-view of the user and a camera directed towards the scene 105. In some embodiments, the HMD 120 is replaced with an AR/VR chamber, enclosure, or room configured to present AR/VR content in which the user does not wear or hold the HMD 120.

Figure 2:
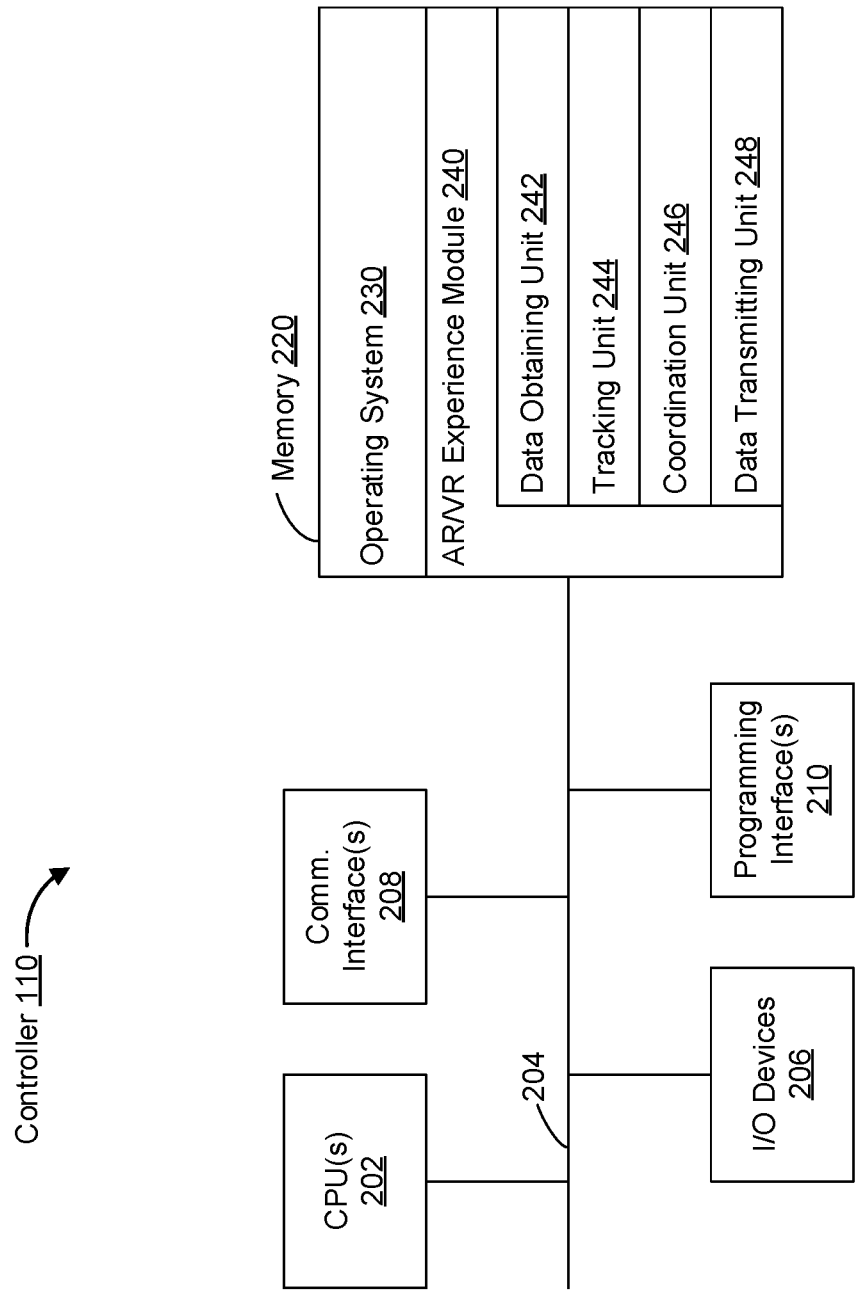
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an augmented reality/virtual reality (AR/VR) experience module 240.

The operating system 230 includes procedures for handling various basic system services and for performing hardware dependent tasks. In some implementations, the AR/VR experience module 240 is configured to manage and coordinate one or more AR/VR experiences for one or more users (e.g., a single AR/VR experience for one or more users, or multiple AR/VR experiences for respective groups of one or more users). To that end, in various implementations, the AR/VR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120 with respect to the scene 105. To that end, in various implementations, the tracking unit 244 includes instructions and/or logic therefor, and heuristics and metadata therefor.

In some implementations, the coordination unit 246 is configured to manage and coordinate the AR/VR experience presented to the user by the HMD 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features which are present in a particular embodiment as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 3:
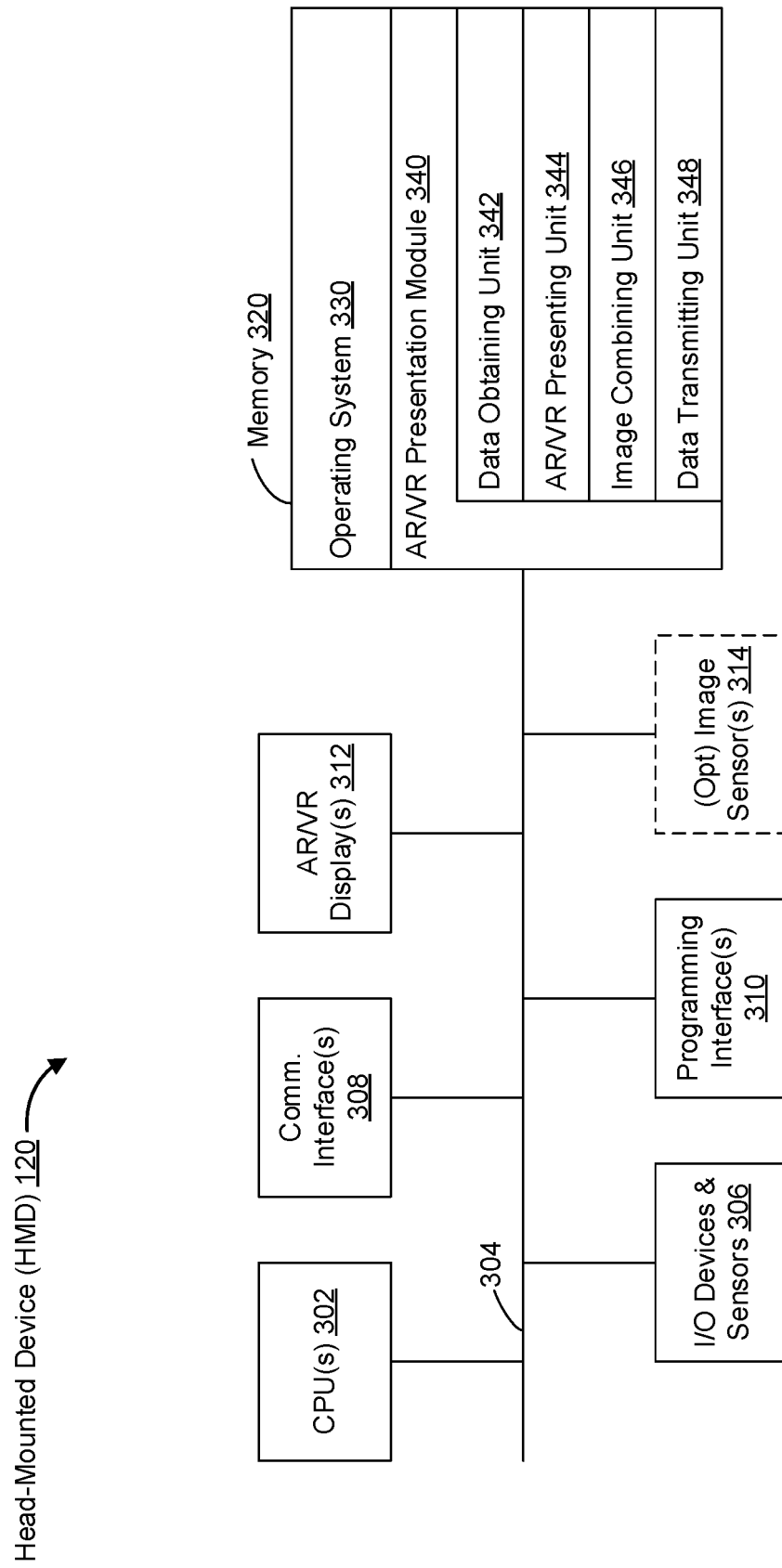
FIG. 3 is a block diagram of an example head-mounted device (HMD) in accordance with some implementations.

FIG. 3 is a block diagram of an example of the head-mounted device (HMD) 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more AR/VR displays 312, one or more optional interior and/or exterior facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more AR/VR displays 312 are configured to present the AR/VR experience to the user. In some embodiments, the one or more AR/VR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), holographic displays, and/or the like display types. In some embodiments, the one or more AR/VR displays 312 correspond to diffractive, reflective, polarized, holographic, etc. waveguide displays. For example, the HMD 120 includes a single AR/VR display. In another example, the HMD 120 includes an AR/VR display for each eye of the user. In some embodiments, the one or more AR/VR displays 312 are capable of presenting AR and VR content. In some embodiments, the one or more AR/VR displays 312 are capable of presenting AR or VR content.

In some implementations, the one or more optional image sensors 314 are configured to obtain image data that corresponds to at least a portion of the face of the user that includes the eyes of the user. For example, the one or more optional image sensors 314 correspond to one or more RGB camera (e.g., with a complimentary metal-oxide-semiconductor (CMOS) image sensor or a charge-coupled device (CCD) image sensor), IR camera, event-based camera, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330, an AR/VR presentation module 340, and a user data store 360.

The operating system 330 includes procedures for handling various basic system services and for performing hardware dependent tasks. In some implementations, the AR/VR presentation module 340 is configured to present AR/VR content to the user via the one or more AR/VR displays 312. To that end, in various implementations, the AR/VR presentation module 340 includes a data obtaining unit 342, an AR/VR presenting unit 344, an image combining unit 346, and a data transmitting unit 348.

In some implementations, the data obtaining unit 342 is configured to obtain data (e.g., presentation data, interaction data, sensor data, location data, etc.) from at least o the controller 110. To that end, in various implementations, the data obtaining unit 342 includes instructions and/or logic therefor, and heuristics and metadata therefor.

In some implementations, the AR/VR presenting unit 344 is configured to present AR/VR content via the one or more AR/VR displays 312. To that end, in various implementations, the AR/VR presenting unit 344 includes instructions and/or logic therefor, and heuristics and metadata therefor.

In some implementations, the image combining unit 346 is configured to generate, for a particular pixel of an image, a combined pixel value as a weighted average of a real pixel value and a virtual pixel value, the weighting being based on at least one of a first alpha and a second alpha. To that end, in various implementations, the image combining unit 346 includes instructions and/or logic therefor, and heuristics and metadata therefor. Further, in some implementations, the data obtaining unit 342 is configured to obtain, for the particular pixel of the image, the first alpha, the second alpha, the real pixel value, and the virtual pixel value.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the AR/VR presenting unit 344, the image combining unit 346, and the data transmitting unit 348 are shown as residing on a single device (e.g., the HMD 120), it should be understood that in other implementations, any combination of the data obtaining unit 342, the AR/VR presenting unit 344, the image combining unit 346, and the data transmitting unit 348 may be located in separate computing devices.

Moreover, FIG. 3 is intended more as functional description of the various features which are present in a particular embodiment as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 4:
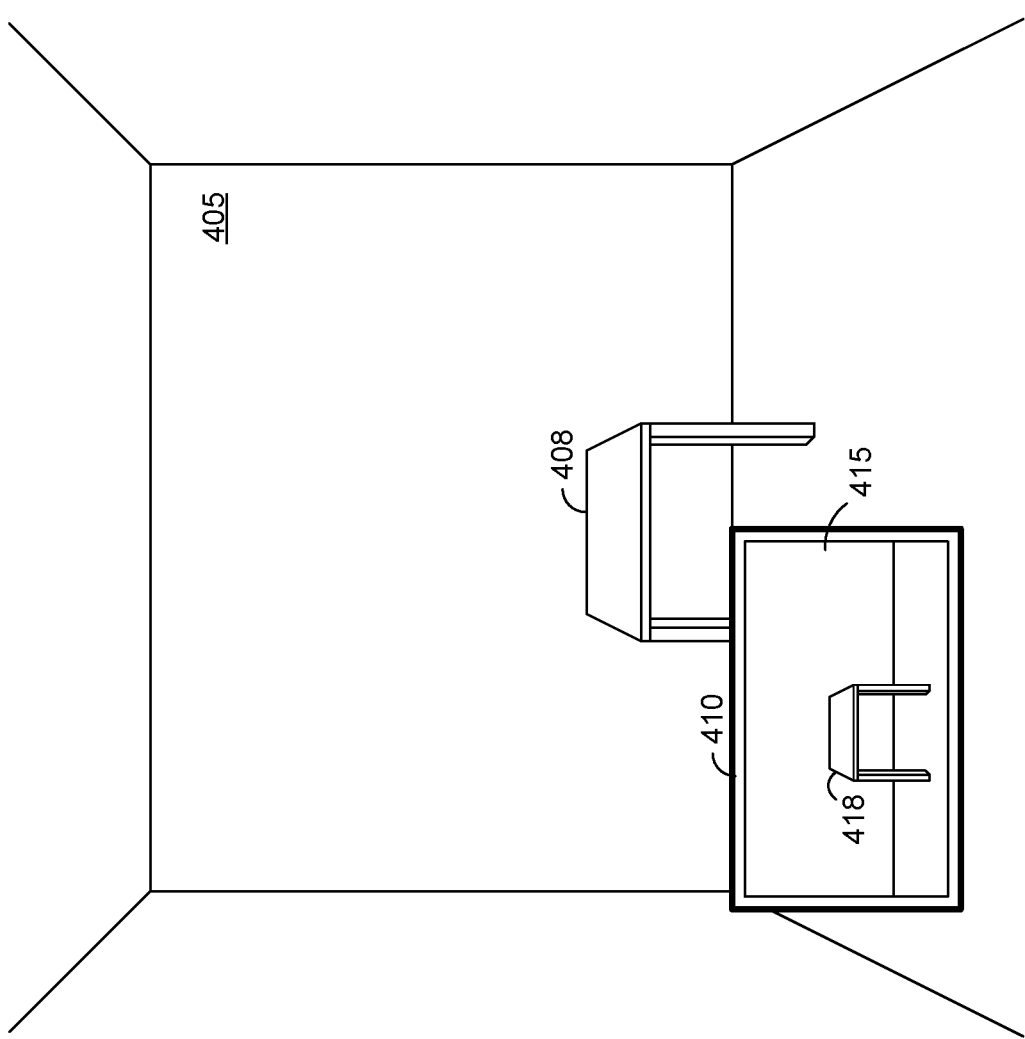
FIG. 4 illustrates a scene with an electronic device (e.g., an HMD) surveying the scene.

FIG. 4 illustrates a scene 405 with an electronic device 410 (e.g., an HMD) surveying the scene 405. The scene 405 includes a table 408 in a foreground area against a background area (e.g., the wall and floor of the scene 405). Accordingly, the electronic device 410 displays a representation of the scene 415 including a representation of the table 418 in a foreground area against a background area.

Figure 5:
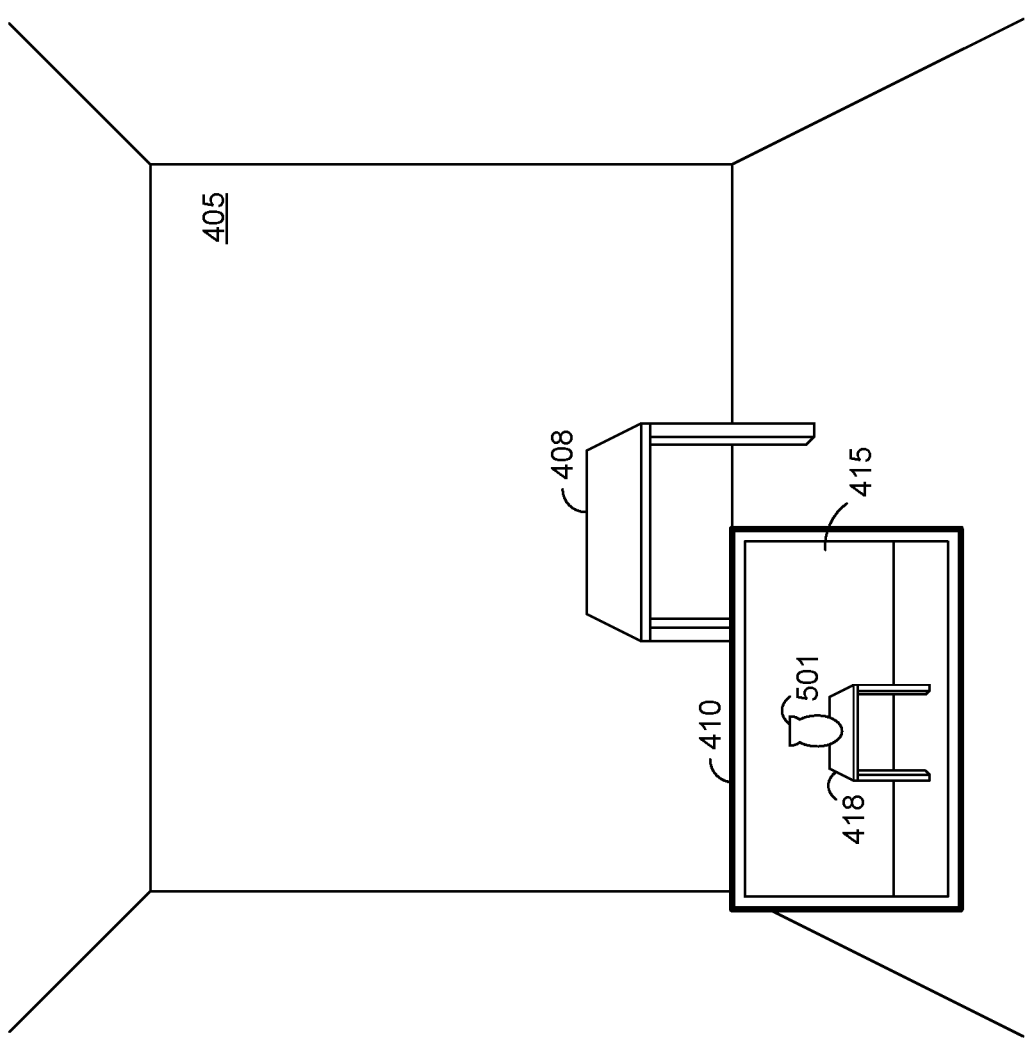
FIG. 5 illustrates the scene of FIG. 4 with the electronic device displaying a virtual object in the foreground area.

FIG. 5 illustrates the scene 405 of FIG. 4 with the electronic device 410 displaying a virtual object 501 in the foreground area. In FIG. 5, the representation of the scene 415 displayed by the electronic device 410 includes a virtual object 501 (e.g., a vase) displayed on the representation of the table 418. The virtual object 501 does not have a counterpart in the scene 405, but is generated for display on the electronic device 410.

Figure 6:
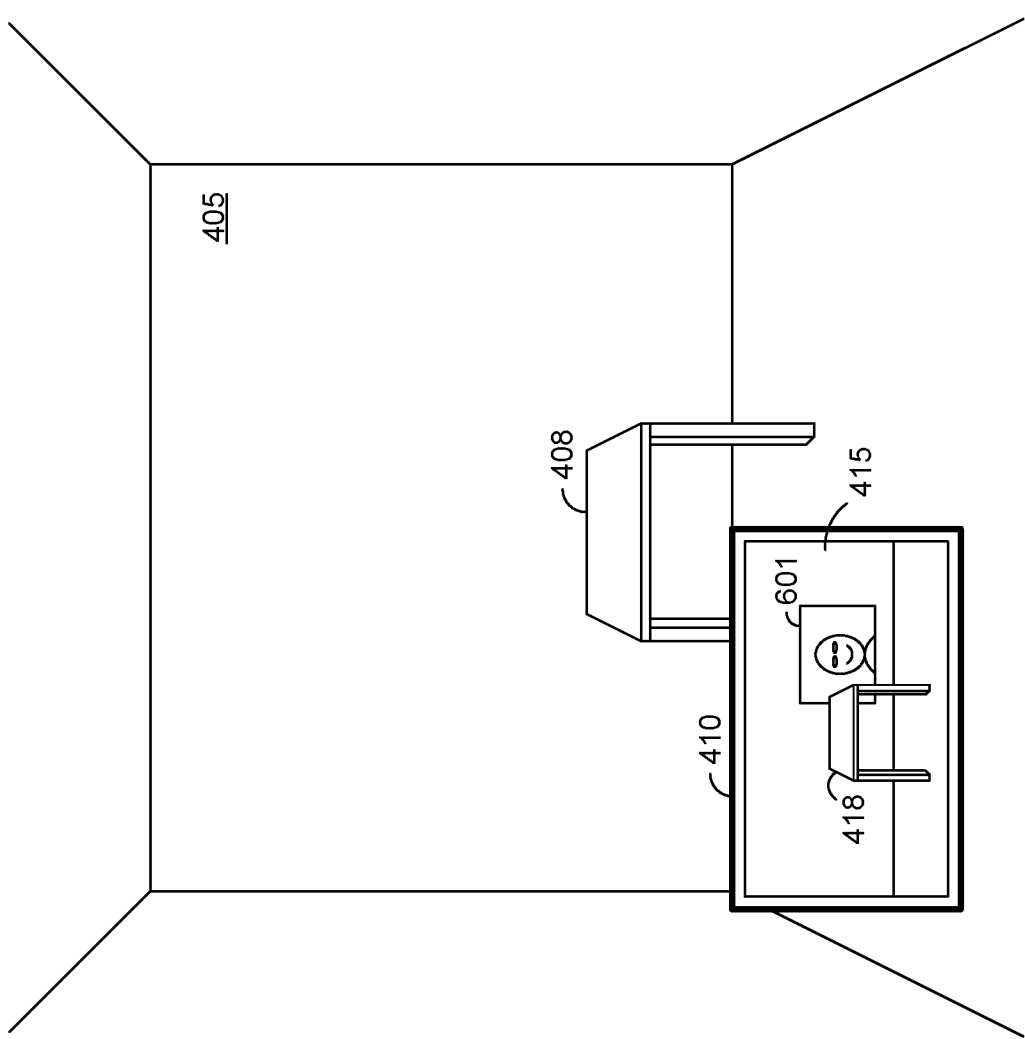
FIG. 6 illustrates the scene of FIG. 4 with the electronic device displaying a virtual object in the background area.

FIG. 6 illustrates the scene 405 of FIG. 4 with the electronic device 410 displaying a virtual object 601 in the background area. In FIG. 6, the representation of the scene 415 displayed by the electronic device 410 includes a virtual object 601 (e.g., a picture) displayed behind the representation of the table 418. The virtual object 501 does not have a counterpart in the scene 405, but is generated for display on the electronic device 410. Unlike the virtual object 501 in FIG. 5, the virtual object 601 in FIG. 6 is displayed behind (and is partially occluded by) the representation of the table 418.

Figure 7:
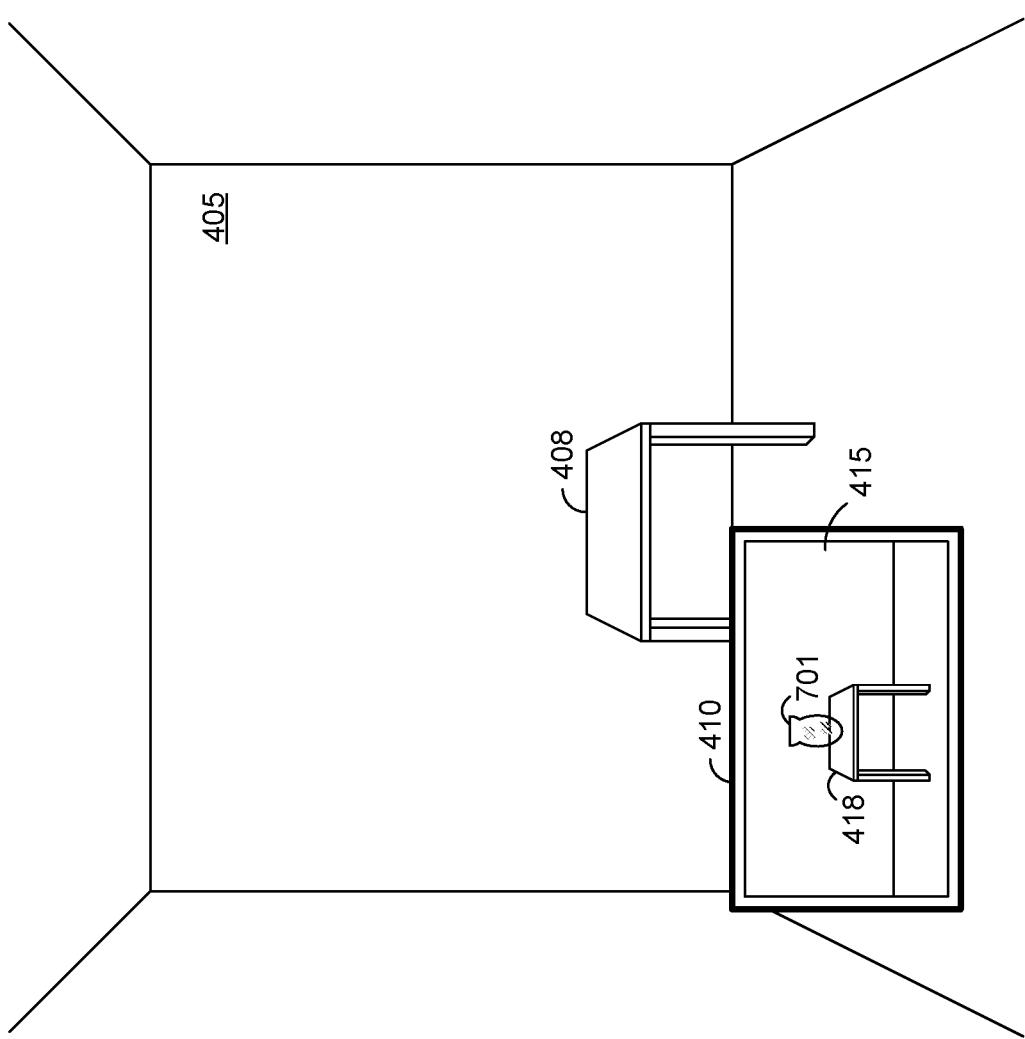
FIG. 7 illustrates the scene of FIG. 4 with the electronic device displaying a partially transparent virtual object in the foreground area.

FIG. 7 illustrates the scene 405 of FIG. 4 with the electronic device 410 displaying a partially transparent virtual object 701 in the foreground area. In FIG. 7, the representation of the scene 415 displayed by the electronic device 410 includes a partially transparent virtual object 701 (e.g., a glass vase) displayed on the representation of the table 418. The partially transparent virtual object 701 does not have a counterpart in the scene 405, but is generated for display on the electronic device 410. Unlike the virtual object 501 in FIG. 5, the partially transparent virtual object 701 in FIG. 7 does not wholly occlude portions of the representation of the table 418. However, the partially transparent virtual object 701 partially occludes portions of the representation of the table 418 (and portions of the background region).

Figure 8:
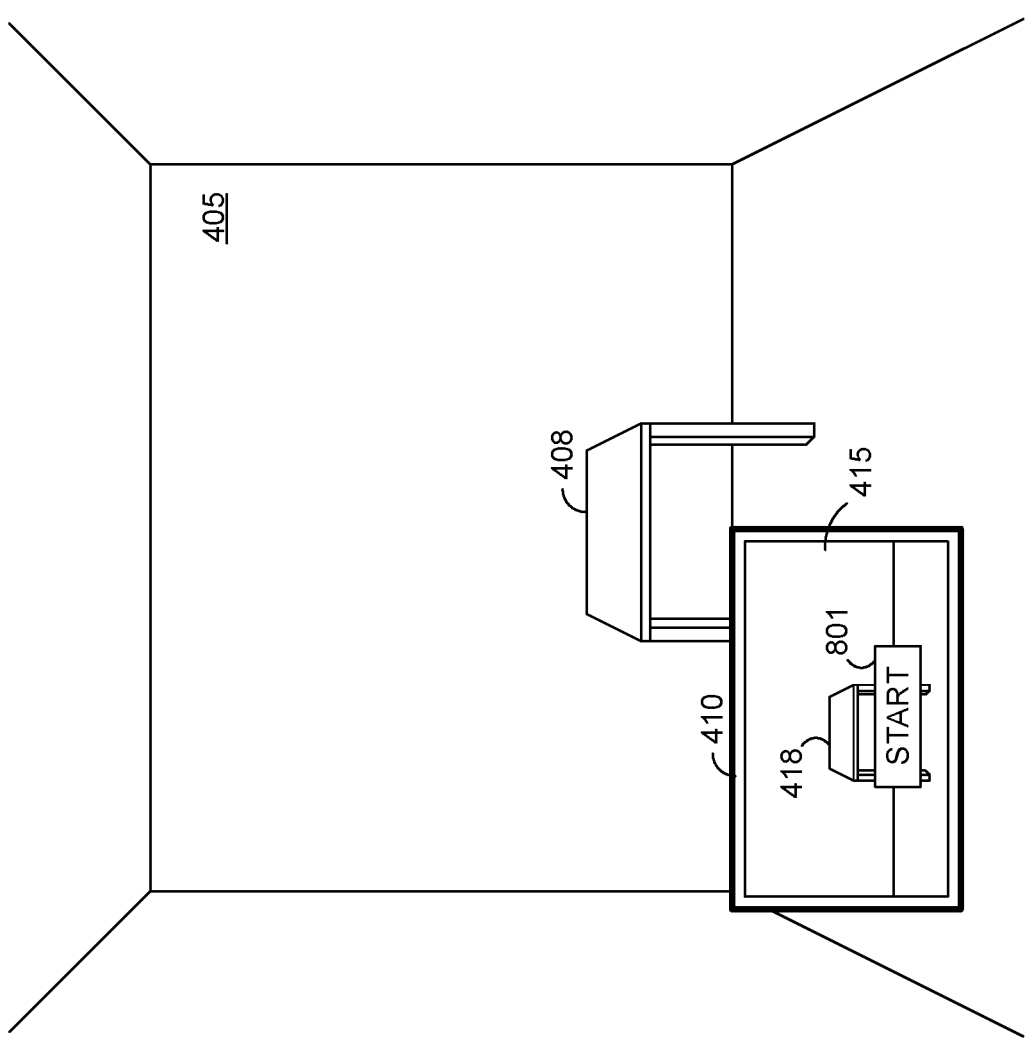
FIG. 8 illustrates the scene of FIG. 4 with the electronic device displaying a virtual object as an overlay.

FIG. 8 illustrates the scene 405 of FIG. 4 with the electronic device 410 displaying a virtual object 801 as an overlay. In FIG. 8, the representation of the scene 415 displayed by the electronic device 410 includes a virtual object 801 (e.g., a start button) displayed on top of the representation of the scene 415. The virtual object 801 does not have a counterpart in the scene 405, but is generated for display on the electronic device 410. The virtual object 801 in FIG. 8 is displayed in front of the representation of the scene 415.

Figure 9:
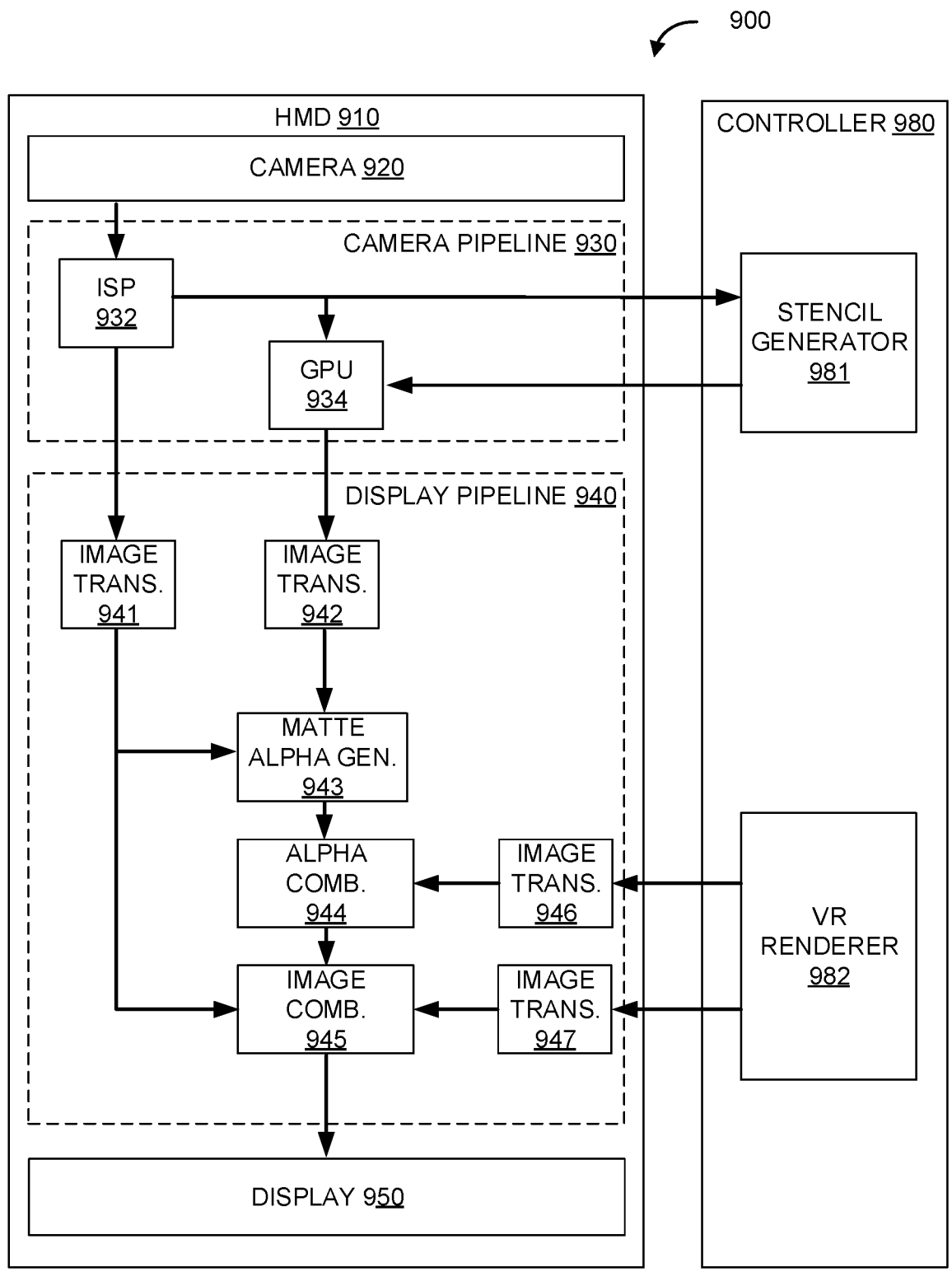
FIG. 9 illustrate a block diagram of an augmented reality system in accordance with some implementations.

FIG. 9 illustrate a block diagram of an augmented reality system 900 in accordance with some implementations. The augmented reality system 900 includes an HMD 910 and a controller 980. The HMD 910 is configured to provide an augmented reality experience to a user via video see-through (e.g., by providing a combined image that includes portions of a real image of a scene and portions of a virtual image of one or more virtual objects).

The HMD 910 includes a camera 920 that generates a camera image of a scene at a camera frame rate (e.g., 100 fps). The camera image includes a matrix of pixels, each having a corresponding pixel value. In various implementations, the camera image is a RAW image that includes, for each pixel (which is associated with a color according to a color filter array, such as a Bayer filter) a light intensity value. In various implementations, the camera image is a grayscale image and the pixel value includes an intensity value. In various implementations, the camera image is a color image and the pixel value includes a coordinate in a color space (and, therefore, includes multiple values). For example, in various implementations, the camera image is an RGB image and the pixel value includes a red value, a green value, and a blue value. As another example, in various implementations, the camera image is a YUV image and the pixel value includes a luminance value and two chroma values. In various implementations, the camera image is a YUV444 image in which each chroma value is associated with one pixel. In various implementations, the camera image is a YUV420 image in which each chroma value is associated with a 2×2 block of pixels (e.g., the chroma values are downsampled).

The HMD 910 includes a camera pipeline 930 with an image signal processor 932 and a graphics processing unit 934. The image signal processor 932 transforms the camera image into a number of other images sent to various other components. In various implementations, image transformation includes upscaling, downscaling, warping (e.g., lens correction), foveation, defoveation, and/or file-type/color-space conversion. The graphical processing unit 934 generates matting parameters, as described further below.

The image signal processor 932 transforms the camera image into a transmitted image, which is sent to the controller 980. In particular, the transmitted image is sent to a stencil generator 981 of the controller 980. The transmitted image includes a matrix of pixels, each having a corresponding pixel value. In various implementations, the transmitted image is a grayscale image or a color image. In various implementations, the transmitted image is an RGB image or a YUV image. In various implementations, the transmitted image is a YUV444 image or a YUV420. In one embodiment, the transmitted image is a 2616×2016 grayscale image. In one embodiment, the transmitted image is a 2616×2016 YUV420 image. For example, in various implementations, the image signal processor 932 sends the controller a 2616×2016 grayscale image at a frame rate of 10 fps and also sends the controller a 2616×2016 YUV420 image at a frame rate of 1 fps.

The image signal processor 932 transforms the camera into a downsampled image, which is sent to the graphics processing unit 934. The downsampled image includes a matrix of pixels, each having a corresponding pixel value. In various implementations, the downsampled image is a grayscale image or a color image. In various implementations, the downsampled image is an RGB image or a YUV image. In various implementations, the downsampled image is a YUV444 image or a YUV420. In one embodiment, the downsampled image is a 327×252 YUV444 image sent to the graphics processing unit 934 at a frame rate of 100 fps. Accordingly, in various implementations, the downsampled image has a resolution that is ⅛ the resolution of the transmitted image. In various implementations, the downsampled image has a resolution that is ¼ the resolution of the transmitted image.

In various implementations, the downsampled image is sent to the graphics processing unit 934 at the camera frame rate, whereas the transmitted image is sent to the controller 980 at a frame rate less than the camera frame rate (e.g., ¹⁄₁₀ and/or ¹⁄₁₀₀ the frame rate of the camera).

The stencil generator 981, upon receiving the transmitted image, generates a stencil indicating the relative position (e.g., foreground or background) of pixels in the image. Accordingly, in various implementations, the stencil generator performs object segmentation, object detection, object tracking, and/or other processing upon the transmitted image.

The stencil includes a matrix of pixels, each having a corresponding pixel value. In various implementations, the stencil is a mask where each pixel value is one of two values that indicates that the corresponding pixel is a foreground pixel or a background pixel. In various implementations, the stencil is a trimap where each pixel value is one of three values that indicates that the corresponding pixel is a foreground pixel, a background pixel, or an unknown pixel. In various implementations, the stencil is a quad-map where each pixel value is one of four values that indicates that the corresponding pixel is a foreground pixel, a background pixel, a first type of unknown pixel, or a second type of unknown pixel. In various implementations, the stencil is a multi-map where each pixel value is one of N+2 values, where each of N values indicates that the corresponding pixel is associated with one of N detected objects, one value indicates that a corresponding pixel is a background pixel, and another value indicates that a corresponding pixel is undefined (or unknown).

The stencil is sent by the stencil generator 981 to the graphics processing unit 934. In one embodiment, the stencil is a 327×252 matrix of two-bit pixel values sent at a frame rate of 100 fps. Accordingly, in various implementations, the stencil has a smaller size (e.g., ¼ or ⅛ size) than the transmitted image. In various implementations, the stencil is transmitted at a higher frame rate (e.g., 10 times or 100 times) than the frame rate of the transmitted image received by the stencil generator 981. Transmission of the transmitted image from the HMD 910 to the controller 980 and receiving the stencil back from the controller 980 introduces a large latency (e.g., on the order of 50 to 100 ms). Accordingly, in various implementations, the higher frame rate is achieved using prediction and/or tracking/re-sampling using, e.g., the transmitted image and data from an inertial measurement unit (IMU).

The graphics processing unit 934 receives the downsampled image (from the image signal processor 932) and the stencil (from the stencil generator 981) and, based on the downsampled image and the stencil, generates a matting parameters matrix. For each pixel of the matting parameters matrix, the graphics processing unit 934 generates a set of matting parameters based on the pixel value of the corresponding pixel of the downsampled image and the pixel value of the corresponding pixel of the stencil.

In one embodiment, for a particular pixel, the graphics processing unit 934 determines a set of four matting parameters ($a_r$, $a_g$, $a_b$, b). Thus, the pixel value of each pixel of the matting parameters matrix includes four values (which may be expressed in 10-bit fixed point or 16-bit floating point).

In various implementations, the four matting parameters are selected via a linear fit. For example, in one embodiment, the four matting parameters for a particular pixel are selected to minimize $(a_r R + a_g G + a_b B + b) - S$, where R, G, and B, are red, green, and blue color component values of the particular pixel and S is the pixel value of the corresponding pixel of the stencil.

In various implementations, the four matting parameters are selected using a convolutional neural network (CNN). In various implementations, the CNN includes one or more of a 3×3 convolutional batch normalization rectified linear unit (ReLU) and/or a 3×3 convolutional linear activation function.

In various implementations, the stencil (from the stencil generator 981) may be misaligned with the downsampled image (from the image signal processor 932). Accordingly, in various implementations, the graphics processing unit 934 aligns the stencil and the downsampled image. In various implementations, the graphics processing unit 934 uses a CNN to align the stencil and the downsampled image, generating an aligned stencil. Thus, in various implementations, the graphics processing unit 934 generates the matting parameters matrix based on the downsampled image and the aligned stencil. In various implementations, aligning the stencil in the graphics processing unit 934 reduces memory traffic, resource usage, and timing conflicts, leading to lower power consumption.

In various implementations, the matting parameters matrix is the same size as the downsampled image (e.g., in one embodiment, 347×252). In various implementations, the matting parameters matrix is sent to the display pipeline 940 (e.g., image transformer 942) at the same frame rate that the downsampled image and the stencil is sent to the graphics processing unit 934 (e.g., in one embodiment, 100 fps).

The image signal processor 932 transforms the camera image into a display pipeline image that is sent to the display pipeline 940 (e.g., image transformer 941). The display pipeline image includes a matrix of pixels, each having a corresponding pixel value. In various implementations, the display pipeline image is a grayscale image or a color image. In various implementations, the display pipeline image is an RGB image or a YUV image. In various implementations, the display pipeline image is a YUV444 image or a YUV420. In one embodiment, the display pipeline image is a 2616×2016 YUV420 image sent to the image transformer 941 at a frame rate of 100 fps. Accordingly, in various implementations, the display pipeline image has a resolution that is the same as the resolution of the transmitted image. In various implementations, the display pipeline image is transmitted at a frame rate equal to the camera frame rate. In various implementations, the display pipeline image is transmitted at a frame rate greater than (e.g., 10 times or 100 times) the frame rate of the transmitted image.

The image transformer 942 transforms the matting parameters matrix into an upscaled matting parameters matrix. In various implementations, image transformation includes upscaling, downscaling, warping (e.g., lens correction), foveation (which may include pixel grouping), defoveation (which may include pixel de-grouping), and/or file-type/color-space conversion. In one embodiment, the matting parameters matrix is a 327×252 matrix and the upscaled matting parameters matrix is 2800×2500 upscaled, lens-corrected, and foveated version of the matting parameters matrix.

The image transformer 941 transforms the display pipeline image into a real image. In various implementations, image transformation includes upscaling, downscaling, warping (e.g., lens correction), foveation, defoveation, and/or file-type/color-space conversion. In one embodiment, the display pipeline image is a 2616×2016 YUV420 image and the upscaled matting parameters matrix is 2800×2500 RGB image, an upscaled, lens-corrected, foveated, and color-space-converted version of the display pipeline image.

Thus, in various implementations, the real image and the upscaled matting parameters matrix are the same size. The image transformer 941 sends the real image to the matte alpha generator 943 and the image transformer 942 sends the upscaled matting parameters matrix to the matte alpha generator 943. In various implementations, the real image and the upscaled matting parameters matrix are sent at the same frame rate (e.g., 100 fps).

The matte alpha generator 943 generates, based on the real image and the upscaled matting parameters matrix, a matte alpha matrix. The matte alpha matrix includes a matrix of pixels, each having a corresponding pixel value (a matte alpha). In various implementations, for a particular pixel, the matte alpha generator 943 generates the pixel value as a sum of the color component pixel values of the particular pixel of the real image weighted by respective color component parameters of the upsampled matting parameter image (with an offset, b). For example, in various implementations, the pixel value is $a_r R + a_g G + a_b B + b$, where R, G, and B, are red, green, and blue color component values of the particular pixel of the real image and $a_r$, $a_g$, $a_b$, and b are the matting parameters of the particular pixel of the upscaled matting parameters matrix. In one embodiment, the matte alpha matrix is 2800×2500 (e.g., the same size as the real image and/or the upscaled matting parameters matrix). In various implementations, the matte alpha is constrained (and/or scaled) between 0 and 1, where 0 indicates complete transparency and 1 indicates complete opacity.

The controller 980 includes a VR renderer 982 that provides information regarding virtual objects to be rendered as part of the augmented reality experience. The VR renderer provides a VR transparency matrix to display pipeline (e.g., image transformer 946) and a VR image to the display pipeline (e.g., image transformer 947). The VR transparency matrix includes a matrix of pixels, each having a corresponding pixel value. The pixel value includes a transparency value (e.g., an alpha) for the particular pixel of the VR image. The VR image includes a matrix of pixels, each having a corresponding pixel value. In various implementations, the VR image is a grayscale image or a color image. In various implementations, the VR image is an RGB image or a YUV image. In various implementations, the VR image is a YUV444 image or a YUV420. In one embodiment, the display pipeline image is a 4200×3280 YUV420 image sent to the image transformer 947 at a frame rate of 100 fps.

The image transformer 946 transforms the VR transparency matrix into a virtual alpha matrix. In various implementations, image transformation includes upscaling, downscaling, warping (e.g., lens correction), foveation, defoveation, and/or file-type/color-space conversion. In one embodiment, the VR transparency matrix is a 4200×3280 matrix and the virtual alpha matrix is 2800×2500 downscaled, lens-corrected, and foveated version of the VR transparency matrix. In various implementations, the virtual alpha (the pixel value of a particular pixel of the virtual alpha matrix) is constrained (and/or scaled) between 0 and 1, where 0 indicates complete transparency and 1 indicates complete opacity.

The image transformer 947 transforms the VR image into a virtual image. In various implementations, image transformation includes upscaling, downscaling, warping (e.g., lens correction), foveation, defoveation, and/or file-type/color-space conversion. In one embodiment, the VR image is a 4200×3280 YUV420 image and the virtual image is a 2800×2500 RGB image, an upscaled, lens-corrected, foveated, and color-space-converted version of the VR image.

The alpha combiner 944 receives the matte alpha matrix from the matte alpha generator 943 and the virtual alpha matrix from the image transformer 946. The alpha combiner generates, based on the matte alpha matrix and the virtual alpha matrix, a combined alpha matrix. The combined alpha matrix includes a matrix of pixels, each having a corresponding pixel value. In various implementations, for a particular pixel of the combined alpha matrix, the pixel value is a product of the pixel value of the corresponding pixel of the matte alpha matrix and the pixel value of the corresponding pixel of the virtual alpha matrix.

In various implementations, a flag bit of the pixel value (e.g., the least significant bit or most significant bit) of a particular pixel of the virtual alpha matrix is treated as a flag bit that indicates whether the pixel value of the corresponding pixel of the matte alpha matrix is to be used in generating the pixel value of the corresponding pixel of the combined alpha matrix. For example, in various implementations, when the flag bit of the pixel value of the particular pixel of the virtual alpha matrix is 1', the pixel value of the combined alpha matrix is simply the pixel value of the corresponding pixel of the virtual alpha matrix (without any contribution from the matte alpha matrix). However, when the flag bit of the pixel value of the particular pixel of the virtual alpha matrix is '0', the pixel value of the combined alpha matrix is a function of the pixel values of the corresponding pixels of the virtual alpha matrix and the matte alpha matrix.

In one embodiment, the combined alpha matrix is 2800×2500 (e.g., the same size as the matte alpha matrix and/or the virtual alpha matrix).

Whereas the matte alpha effects the transparency of the real image and the virtual alpha effects the transparency of the virtual image, these transparency values can be used to simulate ordering in the combined image, creating a perception of foreground and background. For example, the virtual alphas for pixels of the virtual object 501 in FIG. 5 indicate that the virtual object 501 is substantially opaque and, thus, the virtual object 501 appears to be presented in the foreground. As another example, the virtual alphas for the pixels of the virtual object 601 in FIG. 6 indicate that the virtual object 601 is substantially transparent (e.g., the combined alpha is approximately 0) at pixels of the foreground area (e.g., of the representation of the table 418) and opaque at pixels of the background area (e.g., the combined alpha is approximately 1) and, thus, the virtual object 601 appears to be presented in the background. As another example, the virtual alphas for the pixels of the virtual object 701 in FIG. 7 indicate that the virtual object 701 is partially transparent (e.g., combined alpha is between 0 and 1) and, thus, the virtual object 601 appears in the foreground as a transparent object. As another example, the virtual alphas for the pixels of the virtual object 801 in FIG. 8 indicate that the virtual object is presented in front of the representation of the scene 415 (e.g., the combined alpha is 1 irrespective of the matte alpha).

The alpha combiner 944 sends the combined alpha matrix to the image combiner 945. The image combiner 945 also receives the real image from the image transformer 941 and the virtual image from the image transformer 947. The image combiner 945 generates a combined image based on the real image, the virtual image, and the combined alpha matrix. The combined image includes a matrix of pixels, each having a corresponding pixel value. In various implementations, the combined image is a grayscale image or a color image. In various implementations, the combined image is an RGB image or a YUV image. In various implementations, the combined image is a YUV444 image or a YUV420. In one embodiment, the combined image is a 2800×2500 RGB image sent to the display 950 at a frame rate of 100 fps.

For a particular pixel of the combined image, the image combiner determines the pixel value as sum of the pixel values of the corresponding pixels of the real image and the virtual image, weighted by the combined alpha. For example, in one embodiment, the pixel value is determined as $\alpha*V+(1-\alpha)*R$, wherein $\alpha$ is the pixel value of the particular pixel of the combined alpha matrix, V is the pixel value of the particular pixel of the virtual image, and R is the pixel value of the particular pixel of the real image. In another embodiment, the pixel value is determined as $(1-\alpha)*V+\alpha*R$.

The combined image is sent by the image combiner 945 to the display 950 and, with possible image transformation, displayed to the user of the HMD 910.

Figure 10:
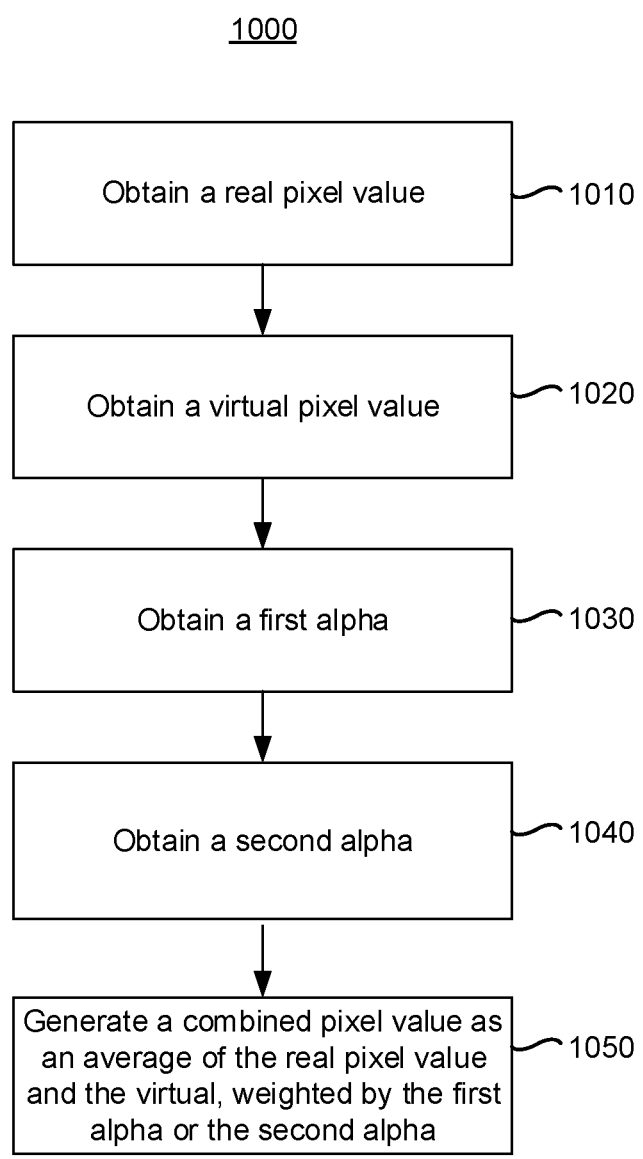
FIG. 10 is a flowchart representation of a method of combining images in accordance with some implementations.

FIG. 10 is a flowchart representation of a method 1000 of combining images in accordance with some implementations. In some implementations (and as detailed below as an example), the method 1000 is performed by a HMD, such as the HMD 910 of FIG. 9, or a portion thereof, such as the display pipeline 940. In various implementations, the method 1000 is performed by a device with one or more processors, non-transitory memory, and one or more AR/VR displays (e.g., the HMD 120 FIG. 3). In some implementations, the method 1000 is performed by processing logic, including hardware, firmware, software, or a combination thereof. In some implementations, the method 1000 is performed by a processor executing code stored in a non-transitory computer-readable medium (e.g., a memory).

Although the method 1000 is described (for each of discussion) with respect to a particular pixel, it is to be appreciated that, in various implementations, the method 1000 is performed for a plurality of pixels of an image (or all of the pixels of an image).

The method 1000 begins, in block 1010, with the HMD obtaining, for a particular pixel, a real pixel value. In various implementations, the real pixel value is a pixel value of a real image based on, derived from, or a transform of a camera image of a scene captured by a camera. For example, in various implementations, obtaining the real pixel value includes capturing, via a camera, a camera image and transforming the camera image into a real image, the real image having, for the particular pixel, the real pixel value. In various implementations, image transformation includes upscaling, downscaling, warping (e.g., lens correction), foveation, defoveation, and/or file-type/color-space conversion.

The method 1000 continues, in block 1020, with the HMD obtaining, for a particular pixel, a virtual pixel value. In various implementations, the virtual pixel value is a pixel value of a virtual image based on, derived from, or a transform of a VR image received from a controller. For example, in various implementations, obtaining the virtual pixel value includes receiving, from a controller, a VR image and transforming the VR image into a virtual image, the virtual image having, for the particular pixel, the virtual pixel value. In various implementations, image transformation includes upscaling, downscaling, warping (e.g., lens correction), foveation, defoveation, and/or file-type/color-space conversion.

The method 1000 continues, in block 1030, with the HMD obtaining, for a particular pixel, a first alpha. In various implementations, the first alpha is a matte alpha based on a camera image of a scene captured by a camera. In various implementations, obtaining the first alpha includes capturing, via a camera, a camera image. In various implementations, the HMD transforms the camera image into a downsampled image. In various implementations, image transformation includes upscaling, downscaling, warping (e.g., lens correction), foveation, defoveation, and/or file-type/color-space conversion. In various implementations, the downsampled image contains significantly less data than the camera image, e.g., approximately ¼ or ⅛ the amount of data.

The HMD obtains a stencil based on the camera image. In various implementations, obtaining the stencil includes transmitting a transmitted image (another transform of the camera image) to a controller and receiving, from the controller, a stencil based on the transmitted image. In various implementations, the downsampled image is approximately ¼ or ⅛ the size of the transmitted image. In various implementations, the downsampled image is approximately ¼ or ⅛ the size of the real image.

In various implementations, the stencil is a mask where each pixel value indicates that the corresponding pixel is a foreground pixel or a background pixel. In various implementations, the stencil is a trimap where each pixel value indicates that the corresponding pixel is a foreground pixel, a background pixel, or an unknown pixel. In various implementations, the stencil is a quad-map where each pixel value indicates that the corresponding pixel is a foreground pixel, a background pixel, a first type of unknown pixel, or a second type of unknown pixel. In various implementations, the stencil is a depth map where each pixel value indicates a relative distance of the pixel from the camera.

The HMD generates a matting parameter matrix based on the downsampled image and the stencil. Accordingly, the HMD generates a matting parameter matrix based on the camera image. The HMD transforms (including upsampling) the matting parameter matrix to generate an upsampled matting parameter matrix. The HMD generates, for the particular pixel of the image, the first alpha based on the pixel value of the particular pixel of the real image (e.g., the real pixel value) and the pixel value of the particular pixel of the upsampled matting parameter matrix. In various implementation, generating the first alpha comprises summing color component pixel values of the pixel value of the particular pixel of the real image weighted by respective color component parameters of the pixel value of the particular pixel of the upsampled matting parameter matrix (and, optionally, adding an offset value).

The method 1000 continues, at block 1040, with the HMD obtaining, for the particular pixel, a second alpha. In various implementations, the second alpha is a virtual alpha based on a VR transparency matrix received from a controller. In various implementations, the HMD transforms the VR transparency matrix into a virtual alpha matrix. In various implementations, image transformation includes upscaling, downscaling, warping (e.g., lens correction), foveation, defoveation, and/or file-type/color-space conversion.

Accordingly, the first alpha is obtained (in block 1030) in association with the real pixel value (e.g., the first alpha is obtained based on the real pixel value or a camera pixel value upon which the real pixel value is also based). Further, the second alpha is obtained (in block 1040) in association with the virtual pixel value (e.g., both are received from the controller or transformed from data received from the controller).

The method 1000 continues, at block 1050, with the HMD generating, for the particular pixel, a combined pixel value as a weighted average of the real pixel value and the virtual pixel value, the weighting being based on at least one of the first alpha and the second alpha. In various implementations, the HMD obtains, for the particular pixel, an alpha mixing flag (e.g., from the controller) and the weighting is based on the alpha mixing flag. In one embodiment, in accordance with the alpha mixing flag being a first value (e.g., '1'), the weighting is based on the second alpha and not the first alpha. Thus, the combined pixel value is $\alpha_V*V+(1-\alpha_V)*R$, wherein $\alpha_V$ is the second alpha, V is the virtual pixel value, and R is the real pixel value. Alternatively, the combined pixel value is $(1-\alpha_V)*V+\alpha_V*R$. In accordance with the alpha mixing flag being a second value (e.g., '0'), the weighting is based on the second alpha and the first alpha. Thus, the combined pixel value is $\alpha_V*\alpha_M*V+(1-\alpha_V*\alpha_M)*R$, wherein $\alpha_M$ is the first alpha.

In various implementations, the combined pixel value is the pixel value of a particular pixel of a combined image and the HMD transforms the combined image into a display image. The HMD displays the display image on a display of the HMD.

As described above, in various implementations, the HMD captures a camera image, with the camera, at a frame rate (e.g., 100 fps). In various implementations, the HMD displays, with the display, at the frame rate with less than a frame delay between capture and the display. Accordingly, in various implementations, neither the camera image nor its transforms (e.g., the real image, the downsampled image, and the transmitted image) are stored by the HMD. Forgoing such storage provides power savings and prevents heat generation at the HMD, which may have stringent constraints on power usage and heat generation that would be violated by storing the camera image (or one of its transforms) in a non-transitory memory of the HMD at the frame rate. At an HMD with such stringent constraints, transmitting the camera image (or a similarly data-sized image) at the frame rate can also violate those constraints. Accordingly, as described above, the transmitted image is sent from the HMD at a transmitted frame rate much lower than the camera frame rate. Thus, the transmitted image is significantly downsampled (in time) as compared to the camera image (e.g., 10 times or 100 times). In various implementations, the transmitted image is, alternatively or additionally, significantly downsampled (in space) as compared to the camera image.

In one embodiment, over one second, the camera generates 100 camera images. Thus, the camera image generates a first amount of data, approximately a 2616×2016 YUV444 image. Over the one second, the transmitted image includes ten 2616×2016 monochrome images and one 2616×2016 YUV420 image. Accordingly, the amount of bandwidth used by the transmitted image is less than one-tenth of the amount of data generated by the camera image. In particular, the amount of bandwidth used by the transmitted image is less than one-twentieth of the amount of data generated by the camera image.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   obtaining, for a particular pixel of an image, a real pixel value;
   obtaining, for the particular pixel of the image, a virtual pixel value;
   determining, for the particular pixel of the image, a first alpha that is based on a function of the real pixel value and a stencil from a controller; and
   generating, for the particular pixel of the image, a combined pixel value as a weighted average of the real pixel value and the virtual pixel value, the weighting being based on the first alpha.

2. The method of claim 1, wherein the first alpha is associated with a corresponding pixel of a real image.

3. The method of claim 2, wherein the stencil is indicative of a relative position of the corresponding pixel of the real image.

4. The method of claim 1, wherein the stencil includes a mask, a tri-map, or a quad-map.

5. The method of claim 1, further comprising obtaining, for the particular pixel of the image, a second alpha that is associated with a corresponding pixel of a virtual image, the weighting being further based on the second alpha.

6. The method of claim 5, wherein the second alpha corresponds to a transparency value associated with the corresponding pixel of the virtual image.

7. The method of claim 5, further comprising obtaining an alpha mixing flag, wherein the weighting between the first alpha and the second alpha is based on the alpha mixing flag.

8. The method of claim 1, wherein obtaining the real pixel value includes:
   capturing, via a camera, a camera image; and
   transforming the camera image into a real image, the real image having, for the particular pixel of the image, the real pixel value.

9. The method of claim 8, further comprising:
   transforming the camera image into a downsampled image;
   obtaining, from the controller, the stencil based on the camera image;
   generating a matting parameter matrix based on the downsampled image and the stencil; and
   upsampling the matting parameter matrix in order to generate an upsampled matting parameter matrix;
   wherein determining the first alpha is based on a pixel value of the particular pixel of the real image and a pixel value of the particular pixel of the upsampled matting parameter matrix.

10. The method of claim 9, wherein the downsampled image has a data size of approximately ¼ or ⅛ a data size of the camera image.

11. The method of claim 9, wherein obtaining the stencil based on the camera image includes:
    transforming the camera image into a transmitted image;
    transmitting, to the controller, the transmitted image; and
    receiving, from the controller, the stencil based on the transmitted image.

12. The method of claim 9, wherein determining the first alpha includes summing color component pixel values of the pixel value of the particular pixel of the real image weighted by respective color component parameters of the pixel value of the particular pixel of the upsampled matting parameter matrix.

13. A non-transitory computer-readable medium having instructions encoded thereon which, when executed by a processor of a first electronic device, cause the processor to perform operations comprising:
    obtaining, for a particular pixel of an image, a real pixel value;
    obtaining, for the particular pixel of the image, a virtual pixel value;
    determining, for the particular pixel of the image, a first alpha that is based on a function of the real pixel value and a stencil from a controller; and
    generating, for the particular pixel of the image, a combined pixel value as a weighted average of the real pixel value and the virtual pixel value, the weighting being based on the first alpha.

14. The non-transitory computer-readable medium of claim 13, wherein the first alpha is associated with a corresponding pixel of a real image, and wherein the instructions cause the processor to perform additional operations comprising:
    obtaining, for the particular pixel of the image, a second alpha that is associated with a corresponding pixel of a virtual image, the weighting being further based on the second alpha.

15. The non-transitory computer-readable medium of claim 14, wherein the stencil is indicative of a relative position of the corresponding pixel of the real image.

16. The non-transitory computer-readable medium of claim 13, wherein obtaining the real pixel value includes:
    capturing, via a camera, a camera image; and
    transforming the camera image into a real image, the real image having, for the particular pixel of the image, the real pixel value.

17. The non-transitory computer-readable medium of claim 16, wherein the instructions cause the processor to perform additional operations comprising:
    transforming the camera image into a downsampled image;
    obtaining, from the controller, the stencil based on the camera image;
    generating a matting parameter matrix based on the downsampled image and the stencil; and
    upsampling the matting parameter matrix in order to generate an upsampled matting parameter matrix;
    wherein determining the first alpha is based on a pixel value of the particular pixel of the real image and a pixel value of the particular pixel of the upsampled matting parameter matrix.

18. The non-transitory computer-readable medium of claim 17, wherein obtaining the stencil based on the camera image includes:
    transforming the camera image into a transmitted image;
    transmitting, to the controller, the transmitted image; and
    receiving, from the controller, the stencil based on the transmitted image.

19. An electronic device comprising:
    a network interface to communicate with a controller; and
    one or more processors to:
        obtain, for a particular pixel of an image, a real pixel value;
        obtain, for the particular pixel of the image, a virtual pixel value;
        determine, for the particular pixel of the image, a first alpha that is based on a function of the real pixel value and a stencil from the controller; and
        generate, for the particular pixel of the image, a combined pixel value as a weighted average of the real pixel value and the virtual pixel value, the weighting being based on the first alpha.

20. The method of claim 8, wherein the first alpha is determined without storing the camera image or a transform thereof.

* * * * *